US006543133B2

(12) United States Patent
D'Arrigo

(10) Patent No.: US 6,543,133 B2
(45) Date of Patent: Apr. 8, 2003

(54) METHOD OF MANUFACTURING ARMATURE/NEEDLE ASSEMBLY FOR A FUEL INJECTION

(75) Inventor: Angelo D'Arrigo, Newport News, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/101,364

(22) Filed: Mar. 20, 2002

(65) Prior Publication Data

US 2002/0092935 A1 Jul. 18, 2002

Related U.S. Application Data

(62) Division of application No. 09/538,963, filed on Mar. 31, 2000, now Pat. No. 6,422,486.

(51) Int. Cl.[7] ................................................ B23P 15/00

(52) U.S. Cl. ............................. 29/888.46; 29/890.124; 29/890.126; 29/890.13

(58) Field of Search ........................... 29/888.4, 888.45, 29/888.46, 890.124, 890.126, 890.129, 890.13, 890.131; 239/585.1, 585.4, 585.5, 533.1, 533.11, 900

(56) References Cited

U.S. PATENT DOCUMENTS 4,030,668 A * 6/1977 Kiwior .................... 239/585.4
4,625,919 A 12/1986 Soma et al. ................ 239/585
4,946,132 A 8/1990 Reiter .................. 251/129.21
5,072,885 A 12/1991 Hans et al. ................. 239/466
5,143,301 A 9/1992 Reiter et al. ............. 239/585.4
5,752,316 A * 5/1998 Takagi et al. .............. 29/888.4
5,775,355 A * 7/1998 Maier et al. ................... 137/1
5,815,920 A * 10/1998 Earhart ..................... 29/890.13
5,820,031 A 10/1998 Reiter et al. ............. 239/585.1
5,875,975 A * 3/1999 Reiter et al. ............. 239/585.1
5,992,018 A 11/1999 Reiter ...................... 29/888.45
5,996,227 A 12/1999 Reiter et al. ............. 29/888.45
6,092,743 A 7/2000 Shibata et al. .............. 239/900
6,199,776 B1 3/2001 Andorfer ................. 239/585.4
6,385,848 B1 * 5/2002 D'Arrigo ............... 29/890.129
6,422,486 B1 * 7/2002 D'Arrigo ............... 239/533.11
6,454,188 B1 * 9/2002 Maier ..................... 239/533.12
2002/0040524 A1 * 4/2002 Noller et al. .......... 29/890.124
2002/0138985 A1 * 10/2002 Dallmeyer et al. .... 29/890.124

FOREIGN PATENT DOCUMENTS

WO WO96/03579 2/1996

* cited by examiner

*Primary Examiner*—I Cuda-Rosenbaum

(57) ABSTRACT

A fuel injector for an internal combustion engine is provided. The fuel injector includes a housing and an armature/needle assembly reciprocally mounted in the housing. The armature/needle assembly includes an armature having an armature end and a longitudinal armature channel extending therethrough and a needle having a longitudinal needle axis and a first needle end inserted in the armature channel. The first needle end is fixedly connected to the armature end. The assembly also includes at least one flow channel between the armature and the needle. The fuel injector further includes a valve seat located downstream of the needle. The needle is selectively engageable and disengageable with the valve seat to preclude fuel flow through an opening in the valve seat and to allow fuel flow through the opening in the valve seat, respectively. A method of forming the armature/needle assembly is also provided.

3 Claims, 4 Drawing Sheets

METHOD OF MANUFACTURING ARMATURE/NEEDLE ASSEMBLY FOR A FUEL INJECTION

CROSS REFERENCE TO RELATED APPLICATIONS

The present application is a divisional application filed pursuant to 35 U.S.C. §§120 and 121 and claims the benefits of prior application Ser. No. 09/538,963 filed Mar. 31, 2000, U.S. Pat. No. 6,422,486 which is hereby incorporated by reference in its entirety.

FIELD OF THE INVENTION

The present invention relates to an armature/needle assembly for a fuel injector.

BACKGROUND OF THE INVENTION

In some prior fuel injector designs, the armature which reciprocates the needle between an open and closed position includes a generally longitudinal channel which extends along a longitudinal axis of the armature. The armature includes at least one, and preferably several, channels located upstream of the needle which extend radially from the longitudinal channel through the armature. Pressurized fuel flows into the longitudinal channel and through the at least one radial channel to the needle/seat interface for injection. The radial channels are preferably drilled through the armature. After drilling, burrs generally must be removed from the channels.

Additionally, with this arrangement, an upper guide must be located along the armature above the radial channel so that the fuel can flow from the radial channel and to the needle/seat interface without interference from the upper guide. An upper guide at this location may interfere with the magnetic operation of the armature when the fuel injector is opened.

It would be beneficial to develop an armature/needle assembly that allows fuel to flow from the armature channel to a location outside of the needle without having to drill the armature and that can use an upper guide, which does not interfere with the magnetic operation of the armature when the fuel injector is opened.

BRIEF DESCRIPTION OF THE INVENTION

Briefly, the present invention provides a fuel injector for an internal combustion engine comprising a housing and an armature/needle assembly reciprocally mounted in the housing. The armature/needle assembly includes an armature having an armature end and a longitudinal armature channel extending therethrough and a needle having a longitudinal needle axis and a first needle end inserted in the armature channel. The first needle end is fixedly connected to the armature end. The assembly also includes at least one flow channel between the armature and the needle. The fuel injector further includes a valve seat located downstream of the needle. The needle is selectively engageable and disengageable with the valve seat to preclude fuel flow through an opening in the valve seat and to allow fuel flow through the opening in the valve seat, respectively.

The present invention also provides an armature/needle assembly for a fuel injector comprising an armature having an armature end and a longitudinal armature channel extending therethrough and a needle having a first needle end inserted in the armature channel. The first needle end is fixedly connected to the armature end. The assembly also includes at least one flow channel between the armature and the needle.

The present invention also provides a method of forming an armature/needle assembly for a fuel injector comprising providing a needle having an upstream end, a downstream end, and a longitudinal axis extending therethrough; compressing the upstream end toward the longitudinal axis; providing an armature having an upstream end, a downstream end, and a longitudinal channel extending therethrough; inserting the upstream end of the needle into the longitudinal channel; and fixedly connecting the upstream end of the needle to the downstream end of the armature.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain features of the invention. In the drawings.

DETAILED DESCRIPTION OF THE PREFERRED EMBODIMENT

Figure 1:
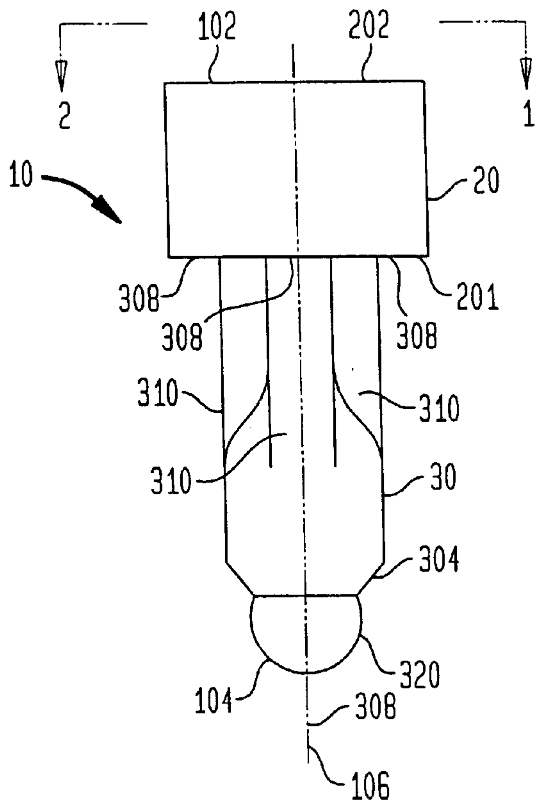
FIG. 1 is a side view of an armature/needle assembly according to a first preferred embodiment of the preferred invention.
Figure 2:
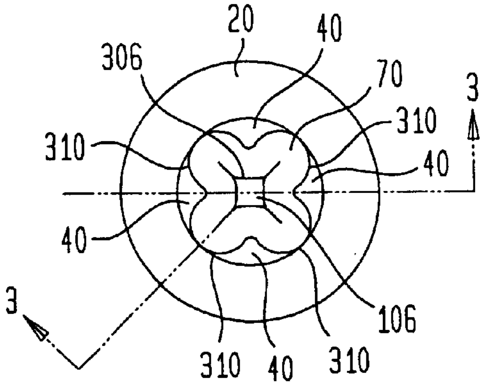
FIG. 2 is a top plan view of the armature/needle assembly taken along line 2—2 of FIG. 1.
Figure 3:
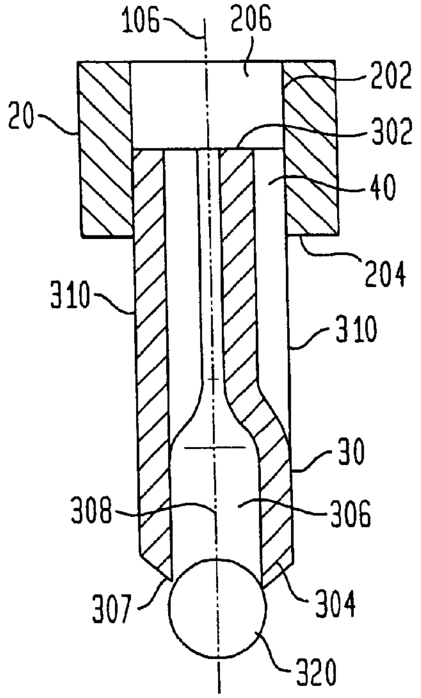
FIG. 3 is a side view, in section of the armature/needle assembly taken along line 3—3 of FIG. 2.
Figure 5:
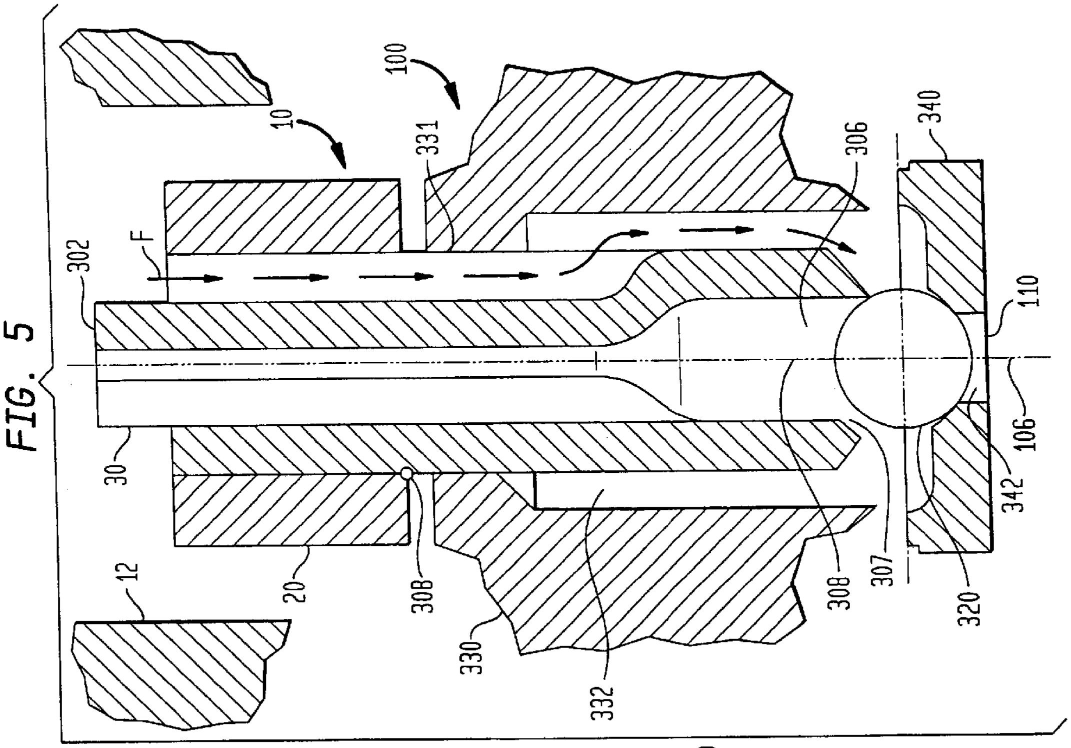
FIG. 5 is a side view, partially in section, of a second preferred embodiment of the armature/needle assembly installed in the fuel injector.
Figure 4:
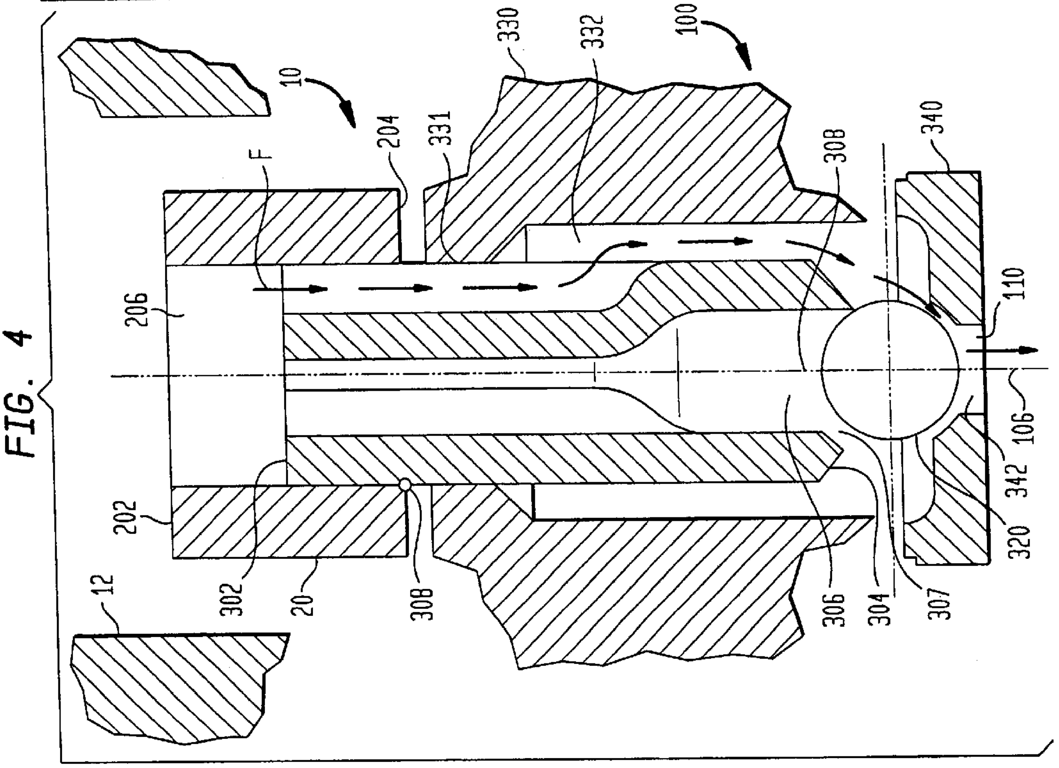
FIG. 4 is a side view, partially in section, of the first preferred embodiment of the armature/needle assembly installed in a fuel injector.
Figure 6A:
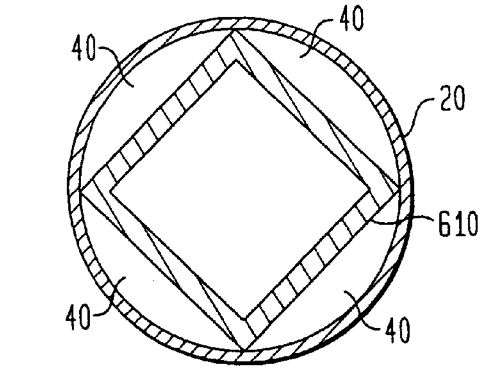
FIGS. 6A–6F are top plan views, in section, of alternate needle designs installed in an armature.
Figure 6D:
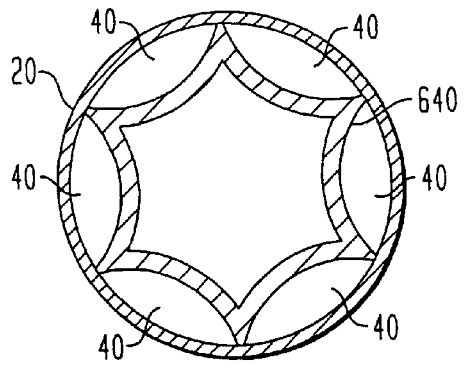
Figure 6B:
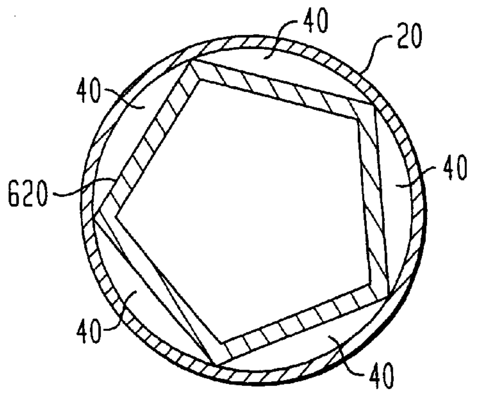
Figure 6E:
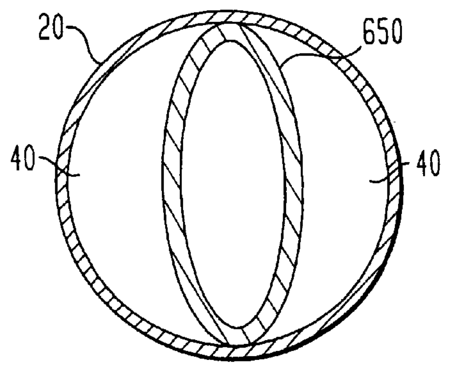
Figure 6C:
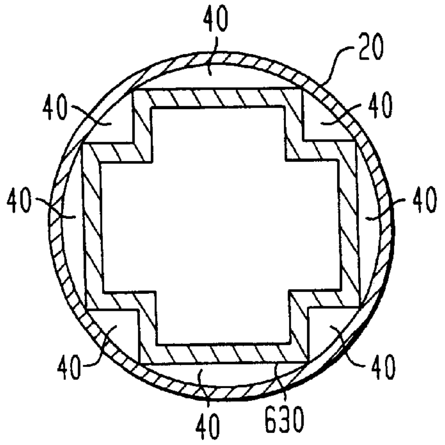
Figure 6F:
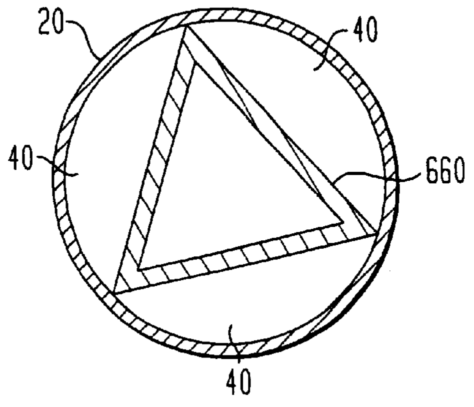

In the drawings, like numerals are used to indicate like elements throughout. Referring now to FIGS. 1–3, a needle/armature assembly 10 (hereinafter "assembly 10") is shown. The assembly 10 is reciprocally mounted in a housing 12 of a fuel injector 100, a portion of which is shown in FIGS. 4 and 5. The assembly 10 is used to meter fuel through a fuel metering channel 110 in the injector 100 for injection into a combustion chamber of an internal combustion engine (not shown). The fuel flows downstream through the assembly 10, as will be described in more detail herein, and to the interface between the assembly 10 and a valve seat 340 at the downstream end of the injector 100. In an energized condition, shown in FIG. 4, an electromagnetic coil (not shown) draws the assembly 10 upstream to an open position, lifting the assembly 10 from the valve seat 340, and allowing fuel to flow through the fuel metering channel 110 for injection. As used herein, the term "upstream" is defined to mean in a direction toward the top of the figure referenced, and "downstream" is defined to mean toward the bottom of the figure referenced. In a de-energized condition, shown in FIG. 5, spring (not shown) forces the assembly 10 downstream to a closed position, so that the assembly 10 engages the valve seat 340, preventing fuel flow through the fuel metering channel 110.

Referring back to FIGS. 1–3, the assembly 10 has an upstream end 102, a downstream end 104, and a longitudinal axis 106 extending therethrough. The assembly 10 is composed of an armature 20 and a needle 30. The armature 20 has an upstream end 202, a downstream end 204, and a channel 206 which extends therethrough along the longitudinal axis 106.

The needle 30 has an upstream end 302, a downstream end 304, and a longitudinal channel 306 having a longitudinal axis 308 extending therethrough. Preferably, the needle 30 is constructed from non-magnetic corrosion resistant steel, such as SAE 300 series austenitic steel, although those skilled in the art will recognize that other suitable materials can be used. The upstream end 302 of the needle 30 is inserted into the channel 206 at the downstream end 204 of the armature 20 and is fixedly connected to the armature 20 by a plurality of welds 308 as will be discussed in more detail later herein. However, those skilled in the art will recognize that the needle 30 can be connected to the armature 20 by other methods, including but not limited to, furnace brazing, swaging the armature 20 to the needle 30, gluing the armature 20 to the needle 30, providing an interference fit between the armature 20 and the needle 30, or by any process known or not as yet discovered to fixedly connect the armature 20 to the needle 30.

The needle 30 is longitudinally crimped at a plurality of locations longitudinally from the upstream end 302 to a point downstream of the downstream end 204 of the armature 20 and generally inward toward the longitudinal axis 106 as will be described in more detail later herein. The crimping compresses the channel 306 and forms a plurality of lobes 310 which extend generally outward from the longitudinal needle axis 308 the length of the crimp. Generally, a lobe 310 is formed between each of two adjacent crimps. As shown in FIGS. 2 and 3, a generally longitudinal channel 40, generally defined by adjacent lobes 310 and the interior wall of the armature 20, is formed. After crimping, the channel 306 remains at least partially open for reasons that will be explained.

As shown in FIG. 4, the assembly 10 is insertable into the injector 100, shown in the figure as a singular needle guide 330 located within the housing 12 downstream of the armature 20 and a valve seat 340 located downstream of the needle 30. The needle guide 330 includes a first channel 331, which has a diameter generally the diameter of the needle 30 between opposite lobes 310. The first channel 331 is preferably located along the needle 30 where the needle 30 is crimped. The needle guide 330 also includes a second channel 332, located downstream of the first channel 331, which is larger than the first channel 331. Instead of being located along the armature 20 as was the case in the prior art, the needle guide 330 is located along the needle 30, which is a preferred location from a magnetic operational point of view for the injector 100 as a whole. As a result, only the upstream end 202 of the armature 20 needs to be chrome plated, as opposed to the upstream end 202 and the sides, as was done with prior art armatures, resulting in easier and less expensive manufacture of the armature 20. Additionally, only one needle guide 330 is necessary, eliminating a manufacturing step and an additional part. During operation of the fuel injector 100, the needle 30 reciprocates along the first channel 331 of the guide 330. Installation of the needle guide 330 along the needle 30 obviates the need for a lower guide (not shown), eliminating a part and an installation step, reducing manufacturing cost of the present injector 100 over the prior art.

The valve seat 340 includes a valve seat opening 342 extending longitudinally therethrough. Preferably, the outer diameter of the needle 30 is larger than the valve seat opening 342. A generally spherical seating body 320 is fixedly connected to the downstream end 304 of the needle 30 for contact with the valve seat 340. Preferably, the seating body 320 is welded to the needle 30, although those skilled in the art will recognize that the seating body 320 can be connected to the needle 30 by other means. For a welded seating body 320, any weld gases that are produced within the channel 306 during the welding process can escape from the channel 306 through the upstream end 302 of the needle 30. The relatively large diameter of the needle 30 allows for easy and quick assembly of the seating body 320 to the downstream end 304 of the needle 30. Preferably, the seating body 320 is constructed from corrosion resistant steel, although those skilled in the art will recognize that other suitable materials can be used. Also, although a spherical seating body 320 is preferred, those skilled in the art will recognize that a generally hemispherical body having a generally flat face connected to the downstream end 304 of the needle 30 can be used.

Also preferably, the seating body 320 is spot welded to the needle 30, providing a flow channel 307 through the needle channel 306, between the needle 30 and the seating body 320, to the channel 332. During hot fuel handling, some of the fuel within the injector 100, mostly around the seat 340 and the seating body 320, vaporizes. This vapor must be removed as soon as possible to re-establish proper fuel flow. By providing the flow channel 307 between the needle 30 and the seating body 320, liquid fuel can flow through the channel 306, through the flow channel 307 and to the seat 340, displacing the vaporized fuel upstream, away from the seat 340, and eliminating any problem with hot fuel during operation.

Also shown in FIG. 4, the upstream end 302 of the needle 30 is contained within the channel 206 of the armature 20. However, a second embodiment, as shown in FIG. 5, can have the upstream end 302 of a needle 30 extend out of the channel 206 and upstream of the upstream end 202 of the armature 20. The upstream end 302 forms a spring guide for the spring (not shown) which biases the needle 30 against the valve seat 340. In each of the two embodiments shown in FIGS. 4 and 5, fuel "F" flows downstream through the armature channel 206, through each of the flow channels 40 (only one flow channel 40 shown in each of FIGS. 4 and 5), and through the channel 332 to the seating body 320. When the injector 100 is opened, the electromagnetic coil (not shown) is energized, and the assembly 10 is pulled upstream by the electromagnetic coil, disengaging the seating body 320 from the valve seat 340, and allowing the fuel F to flow through the valve seat opening 342 for injection. When the injector 100 is closed, the electromagnetic coil is de-energized, and the assembly 10 is forced downstream by a spring (not shown), engaging the seating body 320 against the valve seat 340, and precluding fuel flow through the valve seat opening 342.

Figure 7:
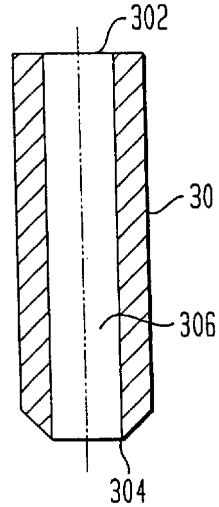
FIG. 7 is a side view, in section, of a needle prior to crimping.
Figure 8:
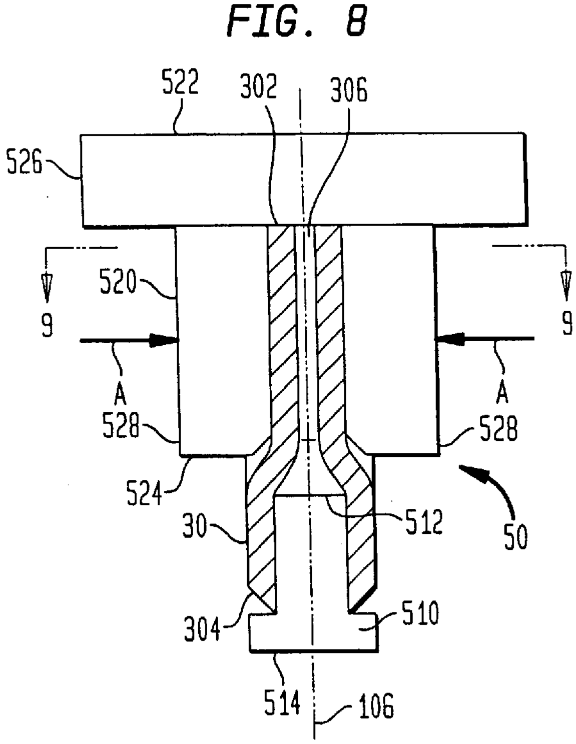
FIG. 8 is a side view, in partial section, of a crimped needle installed in a crimping machine.

To crimp the needle 30, a generally tubular needle, shown in cross-section in FIG. 7, is installed in a crimping tool 50, as shown in FIG. 8. The crimping tool 50 includes an internal die 510 which has an upstream end 512 and a downstream end 514. As shown in FIG. 8, the needle 30 is inserted over the upstream end 512 of the internal die 50 so that the internal die 510 is located in the downstream end of the needle channel 306.

An external die 520, having an upstream end 522 and a downstream end 524, is located over the upstream end 302 of the needle 30. The upstream end 522 of the external die 520 includes a cover 526 which preferably engages the upstream end 302 of the needle 30. The downstream end 524 of the external die 520 includes a plurality of compression side walls 528 which extend downstream along the outside of the needle 30. Each compression side wall 528 extends downstream along the needle 30 to a location above the upstream end 512 of the internal die 510, so that a portion of the needle between the downstream end 524 of the external die 520 and the upstream end 512 of the internal die 510 is not engaged by either the internal die 510 or the external die 520.

Figure 9:
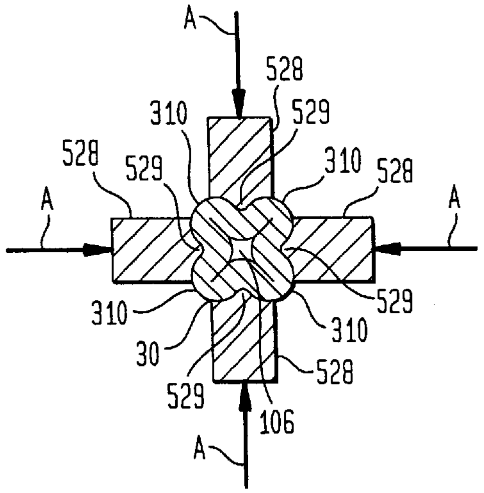
FIG. 9 is a top view of the crimped needle installed in the crimping machine, taken along line 9—9 of FIG. 8.

Preferably, as shown in FIG. 9, four compression side walls 528 are present, with each compression side wall 528 located approximately ninety degrees around the needle 30 from each adjacent compression side wall 528. However, those skilled in the art will recognize that more or less than four compression side walls 528 can be used. Preferably, the compression side walls 528 are symmetrically spaced around the needle 30. Each compression side wall 528 includes a projection 529 which engages the needle 30.

To crimp the needle 30, a motor or other power device (not shown) drives the compression side walls 528 toward the longitudinal axis 106 as shown by the arrows "A" in FIGS. 8 and 9. As each compression side wall 528 is moved radially inward toward the longitudinal axis 106, each respective projection 529 engages the wall of the needle 30, collapsing the wall of the needle 30 at the engagement location and plastically deforming the needle 30, such that a node 310 is formed between each adjacent projection 529, as shown in FIG. 9. As can be seen in FIG. 8, the needle 30 is crimped only part of the way down its length, and the crimped area tapers outward to an uncrimped area the original size and shape of the needle 30, which is retained by the internal die 510 acting against the internal wall of the needle 30.

After crimping, the upstream end 302 of the needle 30 is inserted into the channel 206 of the downstream end 204 of the armature 20. Preferably, only a small clearance exists between the needle 30 and the armature 20, which allows precise axial positioning of the needle 30 with respect to the armature 20. The needle 30 and the armature 20 are fixedly connected to each other by welding each lobe 310 to the armature 20 at welds 308, as shown in FIGS. 1 and 3. Preferably, only the tip of each lobe 310 receives the weld 308, maximizing the size of the flow channel 40 between each lobe 310 and its associated weld 308. After the assembly 10 is assembled, the assembly 10 is inserted into the guide 330 such that the crimped areas are located within the guide 330, forming the flow channels 40. The portions of the needle 30 that are tapered between the crimped areas and the uncrimped area provide a conduit for the fuel flowing through the flow channels 40 to flow to the second channel 332 and to the interface between the seating body 320 and the valve seat 340.

Although the method described above is the preferred method of crimping the needle 30, those skilled in the art will recognize that other methods may be used, including, but not limited to, using pins and rollers, and extrusion.

Although the needle 30 preferably has an original annular cross-section and is crimped to form four lobes 310 so that four flow channels 40 are formed, those skilled in the art will recognize that the needle 30 can be other shapes, such as the cross-sections 610, 620, 630, 640, 650, 660 shown in FIGS. 6A–6G, so long a flow channels 40 can be located between the cross-sections 610, 620, 630, 640, 650, 660 and the armature 20.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined in the appended claims.

What is claimed is:

1. A method of forming an armature/needle assembly for a fuel injector comprising:

providing a needle having an upstream end, a downstream end, and a longitudinal axis extending therethrough;

compressing the upstream end toward the longitudinal axis;

providing an armature having an upstream end, a downstream end, and a longitudinal channel extending therethrough;

inserting the upstream end of the needle into the longitudinal channel; and fixedly connecting the upstream end of the needle to the downstream end of the armature.

2. The method according to claim 1, further comprising, prior to compressing the upstream end of the needle, inserting the downstream end of the needle into a lower die.

3. The method according to claim 1, wherein the compressing the upstream end includes inserting an upper die around the upstream end and driving the upper die toward a longitudinal axis of the needle.

* * * * *